US008212650B2

(12) United States Patent
Tsern et al.

(10) Patent No.: US 8,212,650 B2
(45) Date of Patent: Jul. 3, 2012

(54) SITUATIONALLY AWARE AND SELF-CONFIGURING ELECTRONIC DATA AND COMMUNICATION DEVICE

(75) Inventors: Ely K. Tsern, Los Altos, CA (US); Dave Mooring, Los Altos Hills, CA (US)

(73) Assignee: Wimm Labs, Inc., Los Altos, CA (US)

( * ) Notice: Subject to any disclaimer, the term of this patent is extended or adjusted under 35 U.S.C. 154(b) by 761 days.

(21) Appl. No.: 12/363,397

(22) Filed: Jan. 30, 2009

(65) Prior Publication Data

US 2009/0195350 A1   Aug. 6, 2009

Related U.S. Application Data

(60) Provisional application No. 61/025,742, filed on Feb. 1, 2008.

(51) Int. Cl.
*G08B 21/00* (2006.01)

(52) U.S. Cl. ............... 340/3.1; 340/539.11; 340/573.1; 340/669; 600/300; 600/301; 600/524

(58) Field of Classification Search ............. 340/539.11, 340/573.1, 669, 3.1; 600/300, 301, 524
See application file for complete search history.

(56) References Cited

U.S. PATENT DOCUMENTS

| | | | |
|---|---|---|---|
| 6,792,297 | B2 | 9/2004 | Cannon |
| 7,008,288 | B2 | 3/2006 | Covannon et al. |
| 7,137,069 | B2 | 11/2006 | Abbott et al. |
| 7,155,254 | B2 | 12/2006 | Pinder |
| 7,180,500 | B2 | 2/2007 | Marvit et al. |
| 7,245,216 | B2 | 7/2007 | Burkley et al. |
| 7,257,430 | B2 | 8/2007 | Lenchik et al. |
| 2003/0231551 | A1* | 12/2003 | Saylor et al. .................... 368/10 |
| 2004/0259536 | A1 | 12/2004 | Keskar et al. |
| 2005/0037730 | A1 | 2/2005 | Montague |
| 2005/0200478 | A1* | 9/2005 | Koch et al. ............... 340/539.13 |
| 2005/0219120 | A1 | 10/2005 | Chang |
| 2006/0136173 | A1 | 6/2006 | Case et al. |

(Continued)

FOREIGN PATENT DOCUMENTS

WO   2009055938 A1   5/2009

OTHER PUBLICATIONS

PCT, International Searching Authority, International Search Report and Written Opinion for correponding PCT case, mailed Mar. 17, 2009.

(Continued)

*Primary Examiner* — Jennifer Mehmood
*Assistant Examiner* — Mark Rushing
(74) *Attorney, Agent, or Firm* — Convergent Law Group LLP

(57) ABSTRACT

A self-configuring wearable electronic data and communication device comprising a self-contained module comprising means for self-configuring based on a user's activity and context an operational mode in a plurality of operational modes, wherein the self contained module further comprises intelligent situational awareness derived from at least one of pre-programmed criteria, a sensing ability, a user-specified lifestyle theme, a communication functionality, an accessory, and a user motion pattern. The self-contained module further comprises a display, a processor, a memory, and a battery, and is capable of configuring itself according to an accessory to which it is attached or connected.

43 Claims, 9 Drawing Sheets

U.S. PATENT DOCUMENTS

| | | | |
|---|---|---|---|
| 2006/0143483 | A1 | 6/2006 | Liebenow |
| 2006/0199659 | A1 | 9/2006 | Caldwell |
| 2006/0202816 | A1 | 9/2006 | Crump et al. |
| 2007/0032225 | A1 | 2/2007 | Konicek et al. |
| 2007/0173266 | A1 | 7/2007 | Barnes |
| 2007/0200712 | A1 | 8/2007 | Arneson et al. |
| 2007/0201705 | A1 | 8/2007 | Dorogusker et al. |
| 2007/0225577 | A1 | 9/2007 | Mathan |
| 2007/0276295 | A1 | 11/2007 | Shugg |

OTHER PUBLICATIONS

Confirmation Letter from EPO Counsel Brookes Batchellor confirming EPO amendment, dated Feb. 24, 2011.

Letter of EPO Counsel Brookes Batchellor in response to Rule 161-162, dated Feb. 24, 2011.

Claims filed on Feb. 11, 2011 in response to Rule 161 for corresponding EPO application.

Claims filed on Feb. 11, 2011 in response to Rule 161 for correspsonding EPO application (tracked changes).

"Context-Awareness for Physical Service Environments;" Ambient Intelligence; 2005; <http://www.vepsy.com/communication/book5/05_AMI_Cortese.pdf>.

"Contory: A Smart Phone Middleware Supporting Multiple Context Provisioning Strategies;" Proceedings of the 26th IEEE International Conference on Distributed Computing Systems Workshops (ICDCSW'06); Jul. 4-7, 2006; pp. 68.

"Design of a Wearable Sensor Badge for Smart Kindergarten;" Proceedings to the 6th Interl1atinoal Syn1posiun1 on Wearable Computers (ISWC'02) IEEE; 2002; pp. 231-238.

"Nokia Uses Nano Tech for 'Morph' Concept Cell Phone," Feb. 25, 2008 <http://www.informationweek.com/news/showArticle.jhtml?articleID=206801722>.

PCT International Search Report and Written Opinion of the International Searching Authority, issued Mar. 17, 2009, application No. PCT/US2009/032751.

\* cited by examiner

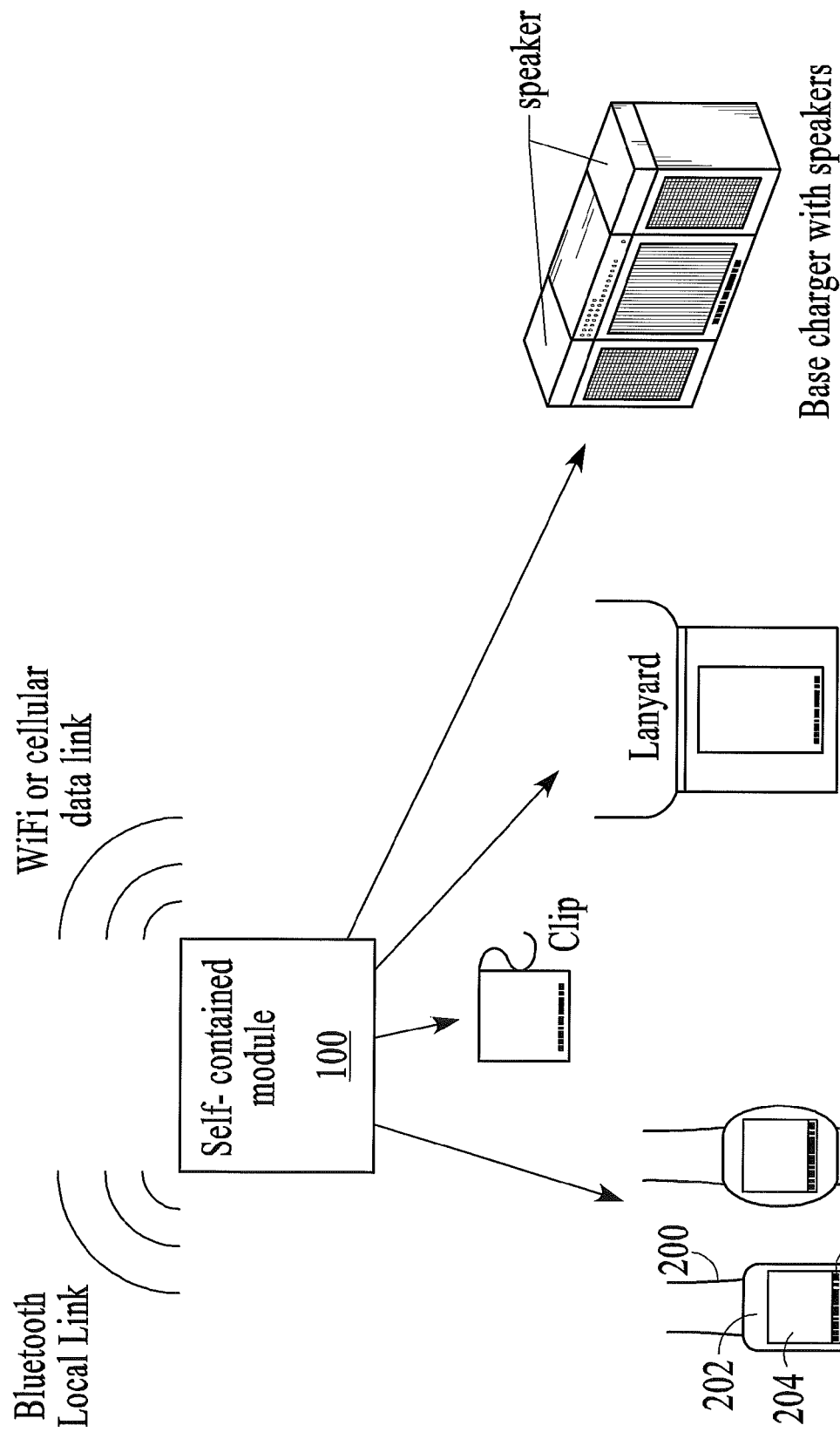

SITUATIONALLY AWARE AND SELF-CONFIGURING ELECTRONIC DATA AND COMMUNICATION DEVICE

CROSS REFERENCE TO RELATED APPLICATIONS

The present application claims priority to Provisional application titled "Situationally Aware and Self-Configuring Electronic Data and Communication Device" filed on Feb. 1, 2008 with Ser. No. 61/025,742, included herein in its entirety by reference.

FIELD OF THE INVENTION

Embodiments of the present invention are directed to an electronic data and communication device comprising a self-contained module capable of configuring itself according to a multitude of scenarios, including a user lifestyle or activity, and according to an accessory to which the self-contained module is attached.

BACKGROUND

Wireless communication technologies, mobile, and computing devices have been rapidly advancing, resulting in powerful, user friendly devices like PDA's, laptops, multi-function cellular phones, wireless compatible watches, etc. These devices, besides providing added multi-functionality, and hence multi-use, also provide the user with additional control. Further, these devices have been rapidly decreasing in size even while increasing in efficiency with respect to power consumption, memory, and processing power.

The wireless technology industry has strived to develop advancements and provide increased computing power and functionality while decreasing size and power consumption. Some of these advancements have been incorporated in wearable devices like wrist watches or small media players. As an example, special wearable wrist watches are available which besides time-keeping, provide the user with a compass, a GPS monitor, a barometer, altimeter, heart rate monitor, etc. These watches are user controlled by onboard programming, which is necessary to avail of desired available, onboard functionality. Sensing capability can be activated when required, on watches which possess such sensing capability.

SUMMARY

An embodiment includes a self configuring electronic data and communication device comprising a self-contained module which further comprises means for reconfiguring itself according to a multitude of scenarios, a display, a processor, a memory, and a battery, and means for communicating with one or more accessories.

Another embodiment includes, in a self-configuring electronic data and communication device comprising a self-contained module and an accessory to which the self-contained module is connected, a system for facilitating communication between the self-contained module and the accessory, comprising electrical contacts on the electronic device which electrical contacts connect with electrical contacts on the accessory.

Another embodiment includes in a self-configuring electronic data and communication device comprising a self-contained module and an accessory to which the self-contained module is connected, a system for facilitating communication between the self-contained module and the accessory, comprising a grooved set of slots on the electronic device, which slots fit into coded ridges on the accessory.

Another embodiment includes in a self-configuring electronic data and communication device comprising a self-contained module and an accessory to which the self-contained module is connected, a system for facilitating communication between the self-contained module and the accessory to which said electronic device is attached comprising a detection device on the module, which detection device identifies a set of magnets placed in a coded fashion on the accessory.

Yet another embodiment includes a self configuring wearable electronic data and communication device comprising a self-contained module which further comprises means to reconfigure itself according to a multitude of scenarios, a display, a processor, a memory, a battery, and a multitude of sensors; and an accessory comprising means to communicate with the self-contained module, recognizable by the self-contained module, and to which accessory the self-contained module is connected.

BRIEF DESCRIPTION OF THE DRAWINGS

FIG. 3 illustrates the self-contained module in relation to some embodiments of its various smart accessories.

DETAILED DESCRIPTION

Figure 1:
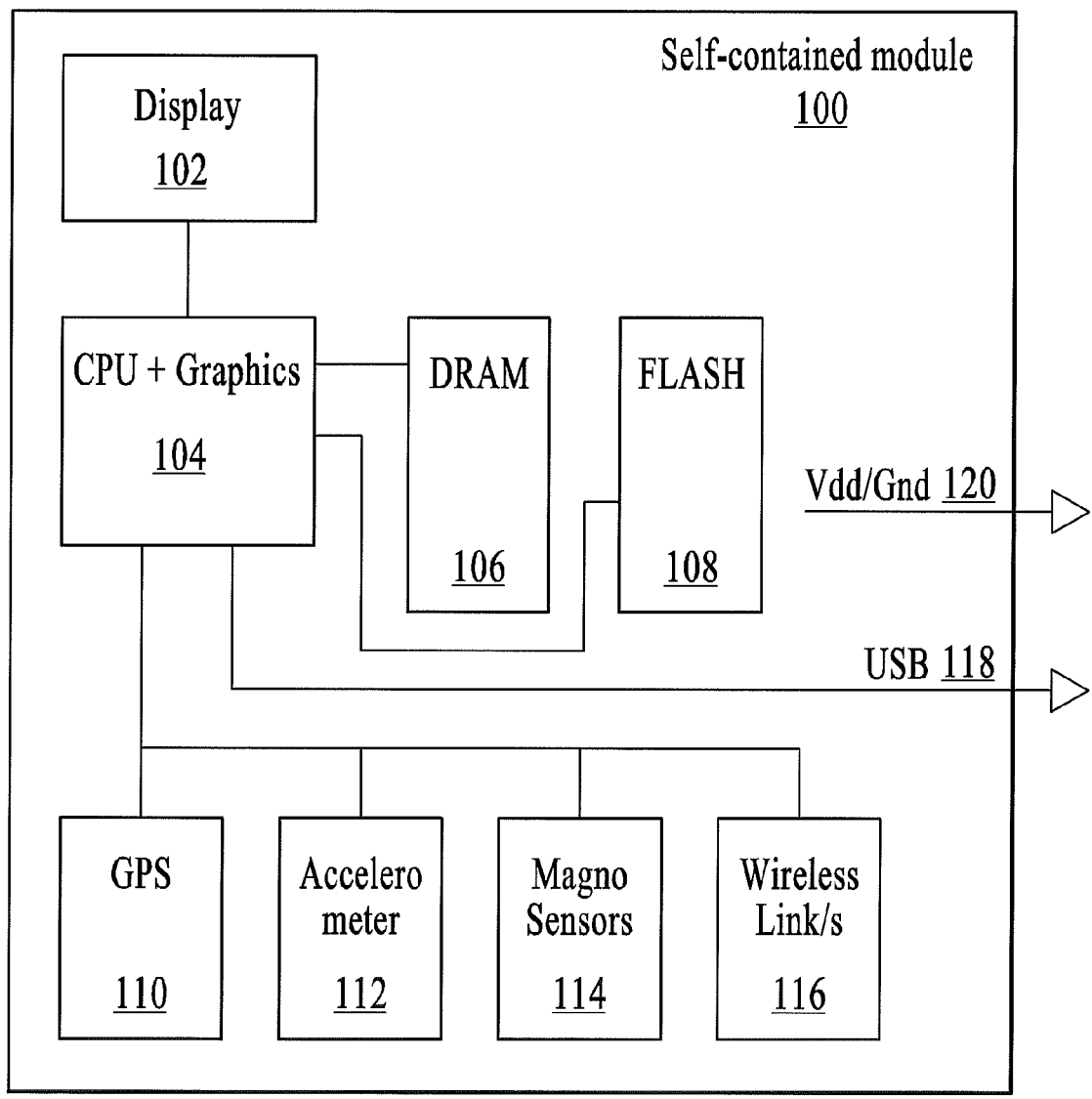
FIG. 1 illustrates the hardware architecture of the self-contained module in one embodiment.

FIG. 1 illustrates the hardware architecture of the self-contained module in one embodiment. An embodiment of the invention includes a self configuring electronic data and communication device comprising a self-contained module which further comprises means for reconfiguring itself according to a multitude of scenarios, a display, a processor, a memory, a battery, and means for communicating with one or more accessories to which it is connected, either physically or wirelessly.

A preferred embodiment of the invention includes a self configuring wearable electronic data and communication device comprising a self-contained module that reconfigures itself according to a multitude of scenarios, the self-contained module comprising a display, a processor, a memory, and a battery. In an embodiment, the self-contained module further comprises a cell-phone, a PDA, a laptop, an MP3 player, or any other computing functionality. The wearable electronic data and communication device further comprises an accessory recognizable by the self-contained module, and to which accessory the self-contained module is attached or connected. In one embodiment, the self-contained module may be implemented as a modular movement that is removably inserted into a receptacle formed into the case of a portable device, such as a watch, for example.

As shown in FIG. 1, a preferred embodiment of the self-contained module 100 comprises a display 102, a processor 104, a GPS module 110, memory which includes a DRAM 106 and FLASH 108, an accelerometer 112, magnetic field-sensors 114, and wireless links 116. Shown also in the embodiment of FIG. 1 are a USB port 118, and a ground 120.

In a preferred embodiment of the self configuring electronic data and communication device, the self-contained module 100 is a wearable module. The self configuring electronic data and communication device further comprises an accessory recognized by the self-contained module, and to which accessory the self-contained module is attached or connected. FIGS. 2a-2e illustrates embodiments of various accessories to which the self-contained module is attached or plugged into.

The wearable, self-contained module 100 further comprises a sensor or a plurality of sensors. Shown in FIG. 1 are magnetic field-sensors 114 and an accelerometer 112. Embodiments can also include motion detection sensors, temperature sensors, bio-sensors, pressure sensors, and light sensors. Additionally and alternatively, a multiple function sensor may be included, which multiple function sensor is capable of functioning as a motion detection sensor, a temperature sensor, a bio-sensor, pressure sensor, and a light sensor.

Figure 2A:
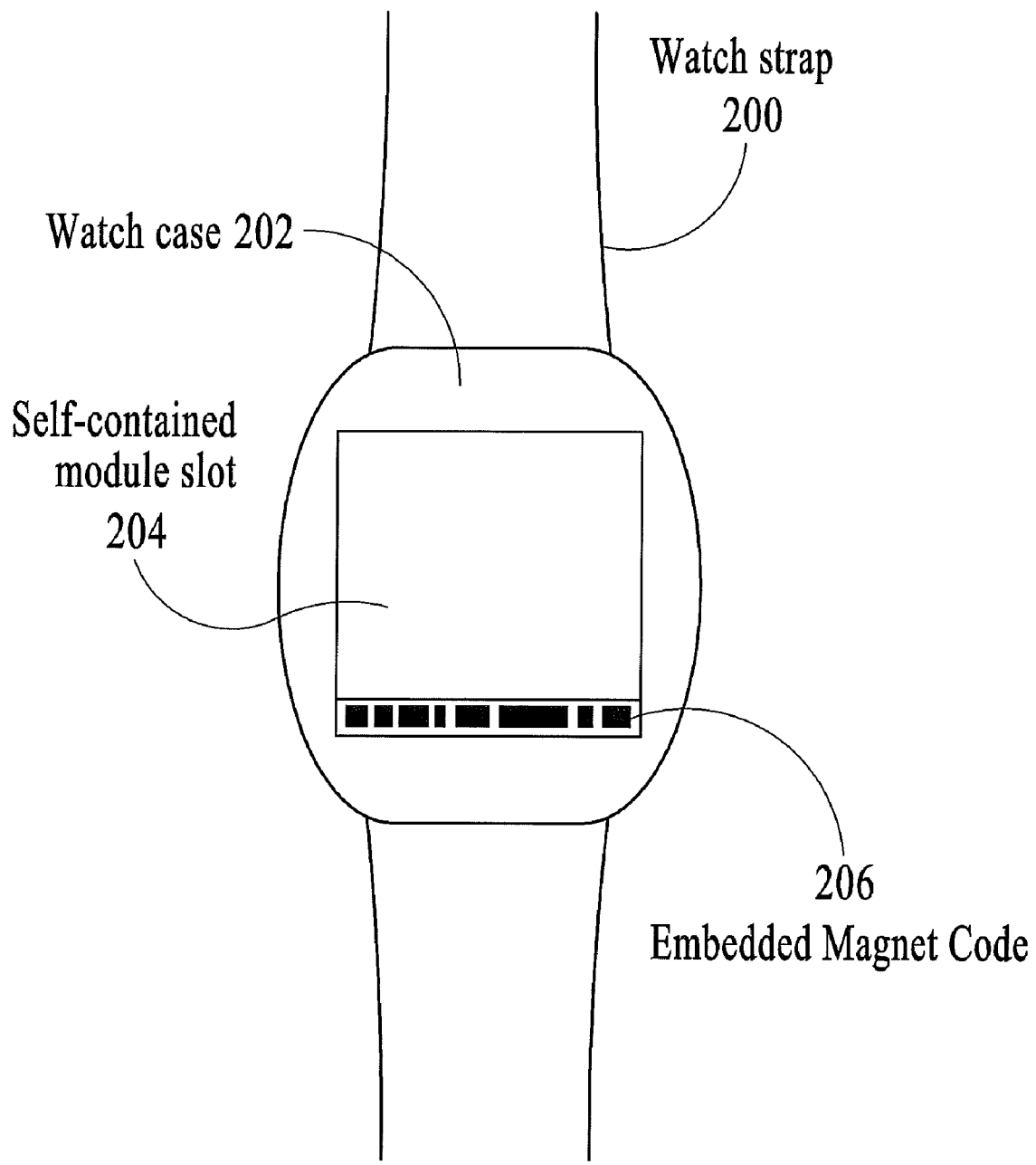
FIGS. 2a-2e illustrates embodiments of various accessories to which the self-contained module is attached or plugged into.

In a preferred embodiment, the self-contained module comprising a motion detection sensor uses sensor information to interpret user activity and enter into a preferred, relevant operational mode based on user activity. Essentially, the motion detection sensor enables the self-contained module to configure itself according to a user activity. For example, the self-contained module may be attached or plugged into a watch-strap which is a sports watch-strap. FIG. 2a illustrates a watch-strap 200 with embedded magnet code 206. When plugged into a sports watch-strap the self-contained module recognizes the sports watch-strap and configures itself for an athletic or sports mode of operation which includes activating the motion detection sensor. Certain applications that are relevant to such a sports mode of operation are activated, and other applications are shut down to conserve power and computing resources. As an example, a calendar that schedule's a user's agenda for the day may be shut down, and a distance/speed calculator, and calorie counter may be activated. A preferred embodiment of the self-contained module is compatible with varied pre-configured branded and un-branded accessory types. As an example, say brands like Nike, Rolex, Reebok, Omega, etc. all produce accessories that are compatible with the self-contained module. A Nike sports watch band may be configured to communicate with the self-contained module so that the self-contained module recognizes the sports watch band. On being attached to the sports watchband, the module can display a "Nike" logo along with the time. Additionally, the module recognizes that it is attached to a sports watch band, and can configure itself into a sports mode of operation wherein (say) sports related applications are activated. For example, a motion detection sensor on the self-contained module could be activated to detect jogging or any other athletic activity, or to function like a pedometer (counting steps). A temperature sensor could be activated to detect a user's body temperature along with the ambient temperature. A bio-sensor could be activated to record and display a user's parameters like heart-beat, calorie count, etc. Additionally and alternatively, every brand associated with the self-contained module could have a package of accessories that are compatible with the self contained module. For example, Nike need not restrict itself to just having accessory sports watch-bands. Nike's accessories may include other attachments like formal watch straps/cases, lanyards, base chargers, docking stations, base chargers with speakers, etc. Additionally, each accessory package can be bundled with specific applications that are downloadable, and that can be run by the self-contained module only with a specific brand's accessory package. So, for example if the module recognizes that it is attached to say, a Nike formal watch strap/case, the module could be pre-configured to run, in addition to its self-configured applications, special applications that run only on a Nike accessory. More specifically, the module could be pre-configured to run specific applications that will run only when the module is attached to a particular accessory of a particular brand-in this case formal watch strap/case by Nike. Additionally, the module may be designed to be compatible with multiple accessories simultaneously. For example, say a user is in a sports mode of operation with the module attached to say, a Nike sports watch band. The user could be jogging, and if the self-contained module detects a compatible wireless headset, the module could self-configure to play music preferred while jogging. In preferred embodiments, when the user purchases a "package" from a brand company (Nike, Rolex, Omega, etc.), they get a band/case, a set of applications, access to specific data over the internet, and possibly special service. When the self-contained module detects its in the particular case and that a certain brand packaged "bundle" was purchased, it enables a particular watch face, application(s), service(s), and data. Various combinations, sub-combinations, and modifications are possible, as would be apparent to a person having ordinary skill in the art.

Figure 2B:
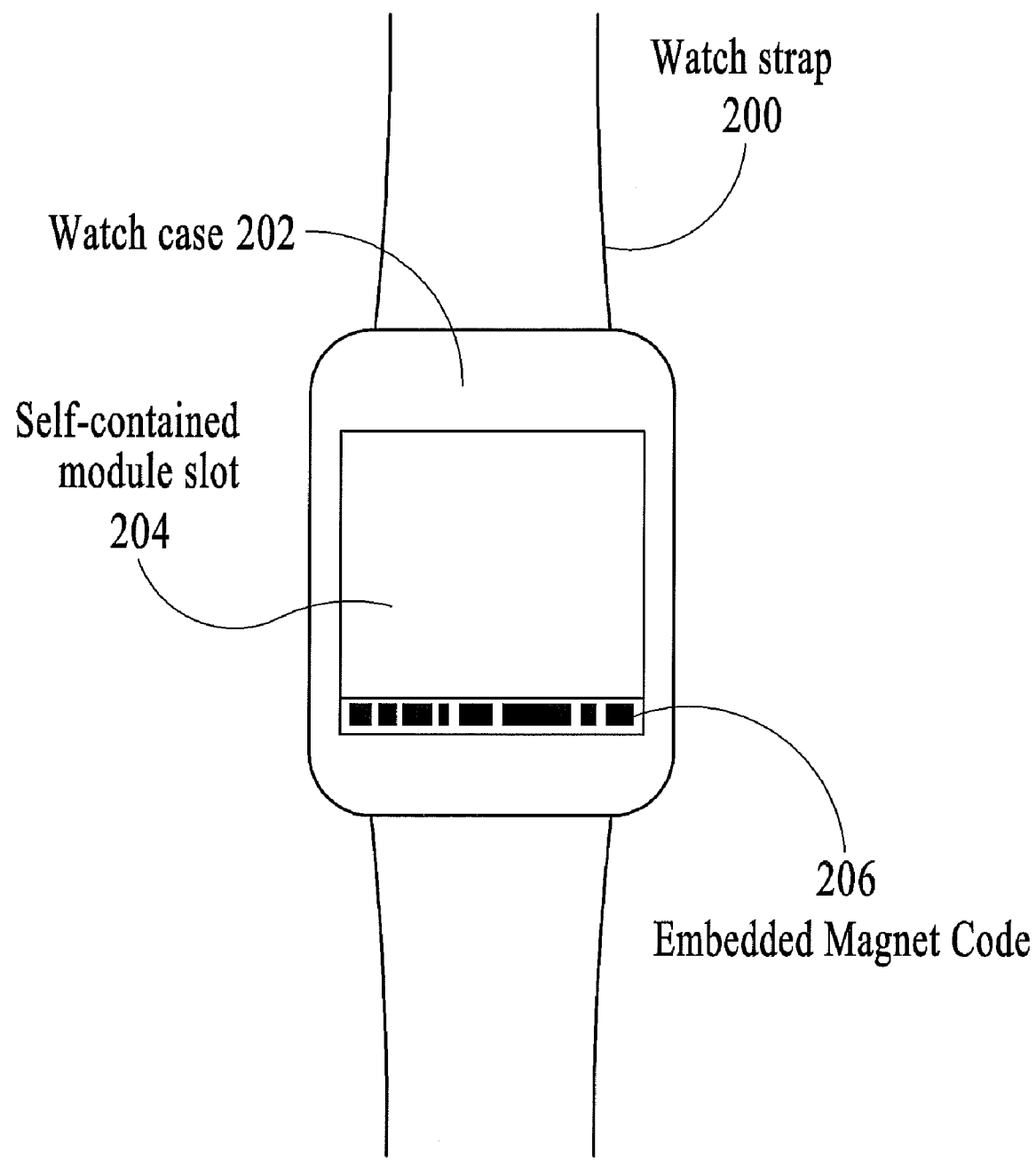
Figure 2C:
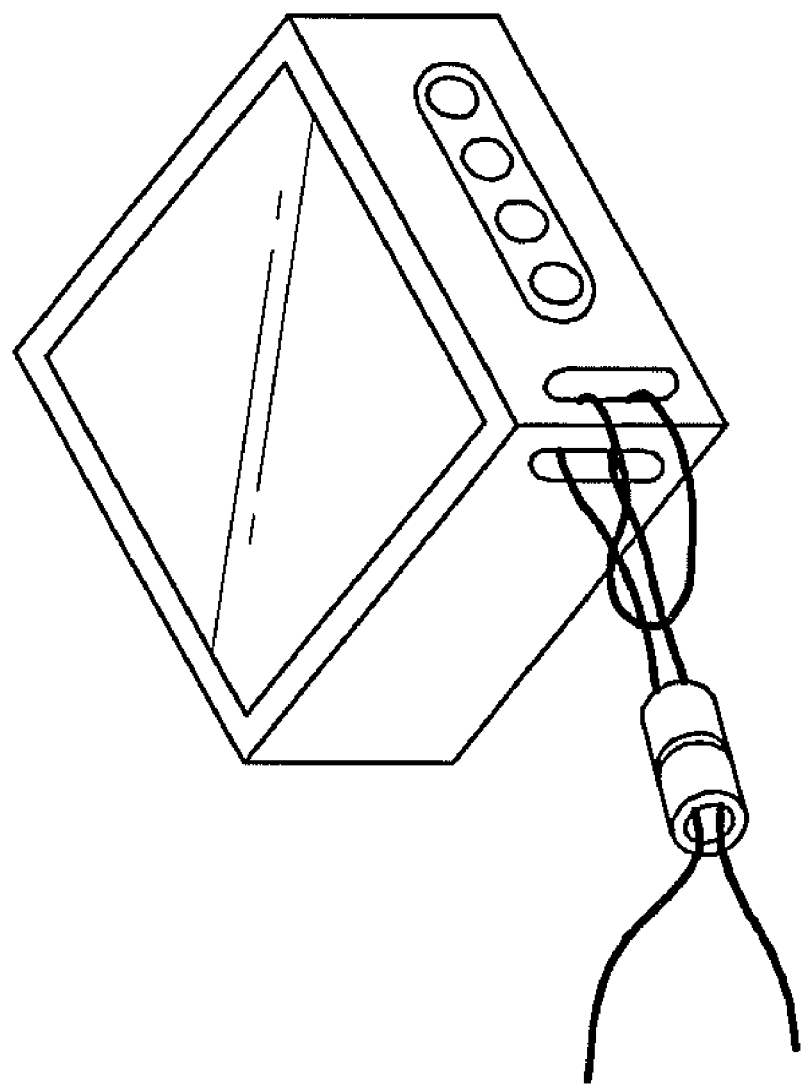
Figure 2D:
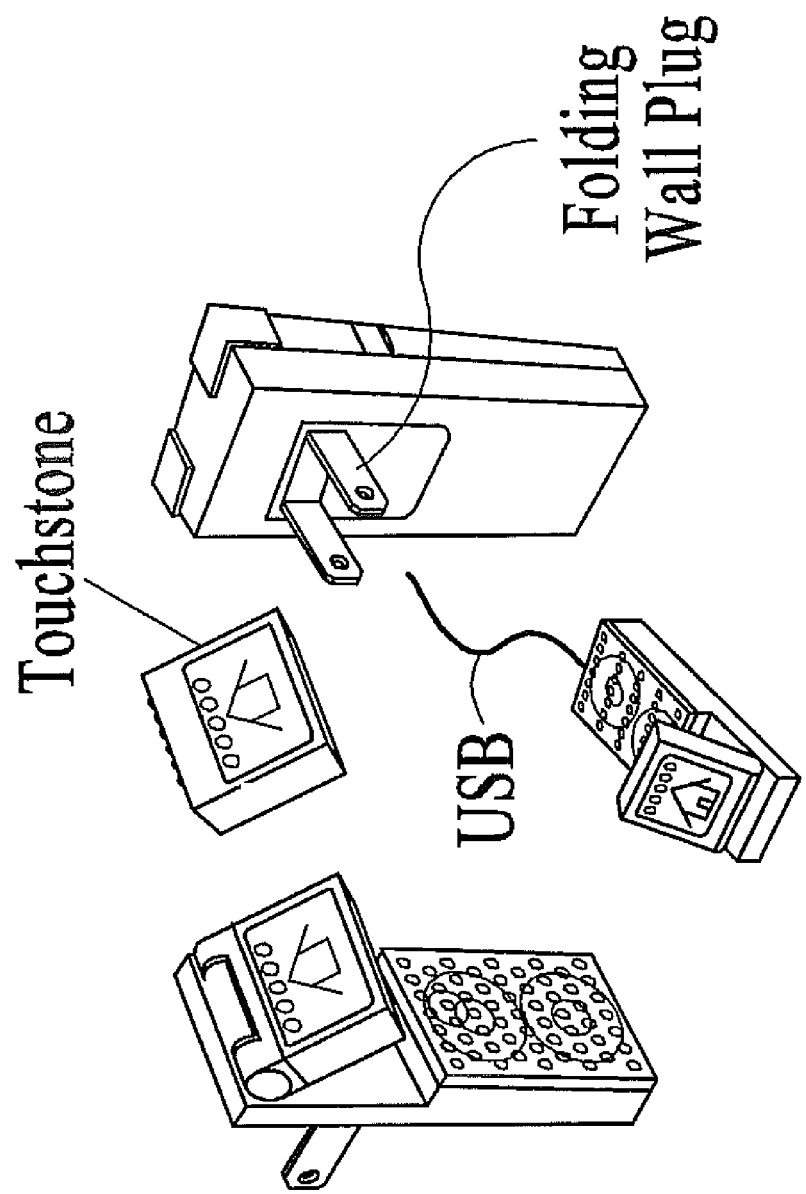
Figure 2E:
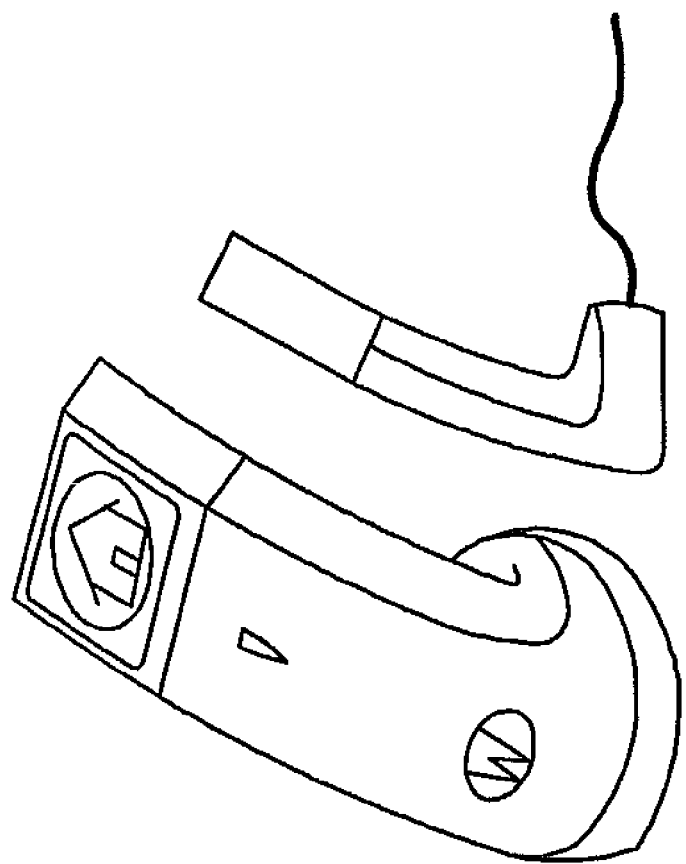

FIG. 2b illustrates an alternate watch case 202. FIG. 2c illustrates a lanyard from which the self-contained module hangs. Such lanyards can be worn around the neck, the waist, or the arm, or facilitate attachment to luggage, purses, or backpacks. Other variants are possible, as would be apparent to a person having ordinary skill in the art. FIG. 2d illustrates an embodiment of a wall charger with speakers, for the self-contained module. The self-contained module detects the charging device when it is plugged into it, and can configure itself to run an application (for example, playing music from a play list, or playing voice messages for a user) accordingly. FIG. 2e illustrates an embodiment of a base charger for the self-contained module. Besides charging, the module can self-configure itself and wirelessly download updates and software upgrades when plugged into the base charger. Several variations and combinations are possible with each of the accessory embodiments as would be apparent to a person having ordinary skill in the art. FIG. 3 illustrates the self-contained module in relation to embodiments of its various smart accessories.

The temperature sensor enables the self-contained module to record and display an ambient temperature or a wearer's body temperature. The self-contained module uses information from the temperature sensor and combines the information with information obtained from the other sensors (viz, the bio-sensor, motion detection sensor, etc.) to run an appropriate, relevant application. For example, if the user is jogging, the self-contained module combines temperature, motion, and bio-parameter information to calculate and display the user's speed, heart-beat, calories burned, etc. Also, the self-contained module can inform the user of average body temperature of a jogger at that particular speed and heart-rate, and display to the user his or her own body temperature.

The bio-sensor enables the self-contained module to record and display a wearer's parameters, such as heart rate, perspiration, blood pressure, etc. Additionally, the self-contained module uses information from the bio-sensor to configure itself according to a user parameter or condition. For example, if the user is jogging too fast, and his or her heartbeat increases beyond a safe range, the self-contained module can trigger an alarm, and display a message that warns the user/wearer, and asks the user to slow down. Additionally, if the user trips/falls, injures himself or herself, or for example, suffers a heart attack while running, the self-contained module can be configured to detect a heart attack and activate its' GPS system to locate the nearest hospital and alert the hospital of a user location, and condition or emergency, as the case may be.

The light sensor enables the self-contained module to record an ambient luminosity, based on which the self-contained module can configure display brightness, and thus enable control of power consumption. For example, if the user is jogging in the dark, the display may light up. Additionally and alternatively, the light sensor can be used to conserve on-board power; if the user is in broad daylight or in a well-lit room, the self-contained module configures itself to switch off the display backlight to conserve on-board power. Also, the ambient light conditions, combined with the time of day, accessory plugged in, and possibly the calendar event, can combine to determine whether to present a different home application (e.g. bedside clock/music application in the evening at night).

The pressure sensor enables the self-contained module to detect when it is at higher altitude and the rate of change of altitude. In an embodiment, rapid rate of change of altitude determines that it is in an airplane, and the user is possibly on a flight. Information obtained from the altimeter enables the electronic device to automatically enter an airplane/flight mode. And a low rate of change of altitude might determine that the user is mountain hiking, and thus enable the electronic device to appropriately reconfigure. Small changes in pressure, such as 1-20 millibars, can be correlated to change in weather, and when detected, can enable the electronic device to retrieve an updated weather forecast.

In a preferred embodiment the self-contained module is designed and pre-programmed to detect several different forms of a user activity. The user activity can be a sports mode or athletic mode, a professional life workday mode, a weekend mode, a shopping mode, and/or a holiday mode. For example, the self contained module can be pre-programmed to enter into a sports application mode if it detects continuous user motion through its motion detection sensor, increased heartbeat through its bio-sensor, continuous change in location through its GPS indicating a user is jogging, a sports watch-band, etc. Pre-configured sports accessories like watch bands compatible with the self-contained module, may have embedded code that the self-contained module detects before entering into a sports mode. FIG. 2a illustrates an embodiment of a watch band with magnetic code embedded on it so that the self contained module, when attached can detect band type, brand, shape, function, etc.

Several compatible alternate accessory types are available for the self-contained module. For example, compatible accessories include, but are not limited to, watch cases, lanyards, clips, handheld cases, charging bases, sound systems, docking stations, etc. Each of these accessory types can have magnetic, mechanical, electrical or other code embedded on them so that when a self-contained module attaches itself to an accessory, it is able to recognize an accessory type, and configure itself accordingly. For example, if the self-contained module is attached to a sound system, the module configures itself to display a play list from music files.

In preferred embodiments, the self-contained module can configure itself to run an application or to provide a user with data based on detected location through its' GPS receiver or/and wireless link. For example, a user may be traveling to another city, country or continent. The GPS system detects time zone to automatically re-adjust the displayed time on the self-contained module. Again, a user on a train journey from say, Menlo Park to San Francisco could be provided with local weather information, coffeehouse locations, places of interest, or maps of the destination when the user reaches, as detected by the GPS system. The configuration with the help of GPS or/and wireless links includes either running a preferred application or/and searching for and displaying relevant data. Essentially, the GPS functionality enables the self-contained module to determine user location, and accordingly run an application or display location relevant data.

In preferred embodiments, the self-contained module has a plurality of operational modes, wherein the module self-configures an operational mode based on pre-programmed criteria, its sensing ability, a lifestyle theme, its GPS functionality, and user activity. Pre-programmed criteria can be defined as a time of the day, a day of the week, a holiday, a festival, a calendar schedule, an event, etc. Thus, self-configuration is effected based on a time of the day, a user work schedule, a user weekend schedule, a user activity, a user lifestyle theme, a user location, a user activity, a user accessory, etc.

As an example, say the user is a professional working five days a week from 9 am to 6 pm on each day. The user may have several items on his or her daily agenda, like things to do, people to call, meetings to attend, a lunch appointment, etc. Let's say the user is going to a meeting on a particular day and needs to make a presentation at the meeting. The self-contained module can update the user with a reminder of the meeting, either once, or multiple times. The self contained module can also set daily reminders about the user's presentation, informing every day of days remaining before the user presents at the meeting. Additionally, the self-contained module can provide the user with meeting relevant applications and/or data, such as power point presentation controls, and can pull up the actual power point data file, which can be wirelessly downloaded to a local PC projector. Again, the user may be accustomed to having lunch on say, Wednesdays, at a particular restaurant. The self-contained module can book a space for the user at that particular restaurant and inform the user of the booking status. In restaurants with compatible systems, the module could even place an order for the user and any accompanying colleagues, customers, friends, etc. Several additional combinations, sub-combinations, and modifications are possible, as would be apparent to a person having ordinary skill in the art.

In an embodiment, a lifestyle theme can be detected according to an accessory type to which the self-contained module is attached. For example, if the self contained module is attached to a sports watch-band, motion and other sensing apparatus may be activated to provide information about a user heartbeat, a user body temperature, number of calories burnt, and the self-contained module runs an application or applications accordingly. And if the accessory is a piece of jewelry like a bracelet or a necklace, the self-configuring module runs an appropriate application displaying the bracelet or necklace brand along with the time and date, if it is pre-configured to do so. Other combinations, configurations and adjustments are possible, as would be apparent to a person having ordinary skill in the art.

Figure 4:
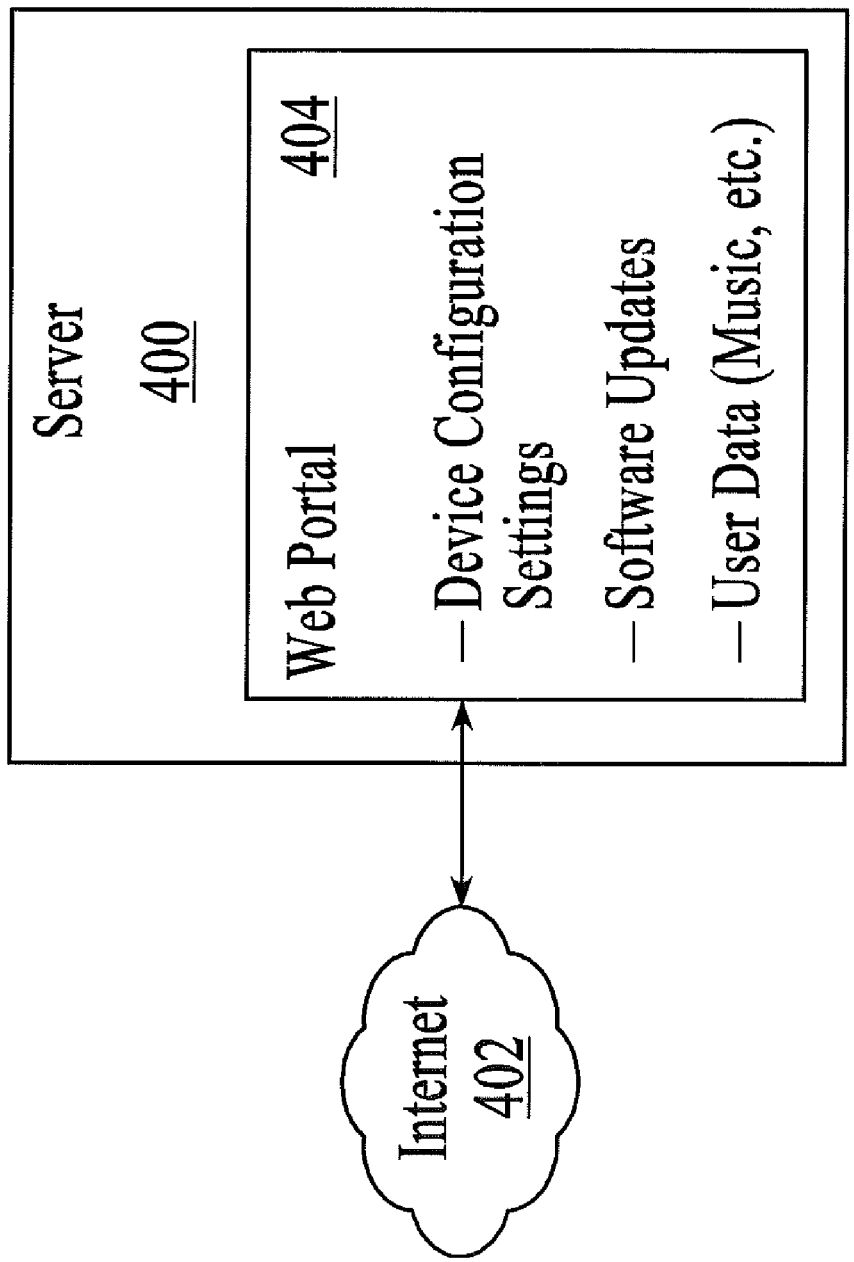
FIG. 4 illustrates a server hosting a web portal from which software upgrades, and device configurations are downloadable via the internet.

Preferred embodiments are equipped to function in a multitude of scenarios and operational modes. The operational modes comprise running an application and displaying it on a user home page, running a preferential application or ordering a set of applications, a power management or power saving mode, a display orientation based on accessory type to which the self-contained module is attached, and a graphic motif or style to match a lifestyle theme and specific accessory style. For example, when, say the self-contained module is attached to a Nike sports watch strap/band, it may display time in a digital format with a Nike logo to give a sporty look, and for user convenience. In a sports mode, it may also have a stop watch timer occupy prime display space with the digital clock occupying secondary display space. Further, the display of the self-contained module can take the shape of the watch case or band to which it is attached. So for example, if the Nike watch case shape is round, the display takes a round shape and adjusts its user interactive touch-screen functions accordingly. If the watch case is square then the display takes a square shape. Other shapes and variations are possible as would be apparent to one skilled in the art. Additionally, if the module is attached to say, a formal Rolex watch band worn on formal occasions, the watch face and hands of the module can match the Rolex watch case/band to which the module is attached. So rather than displaying time digitally, the module displays Rolex watch hands exactly as would be seen in conventional analog, mechanical Rolex watches. FIG. 4 illustrates a server hosting a web portal from which software upgrades, new applications, new watch faces, data exchange, and device configurations are downloadable and up-loadable via the internet. The self-contained module 100 can access the web portal 404 on server 400 through the internet 402 by using a wireless or cellular link (shown in FIG. 3) or via a wired link connected to a docking station. The self-contained module 100 could be pre-configured to periodically connect to the web portal to check for updates. In a preferred embodiment, the self-contained module connects to the web portal 404 for updates when it is docked into a base charger. For example, when the self-contained module is attached to a base charger for charging, it automatically connects to the internet and provides the user the option to update device configuration settings, obtain software updates, or download data, music or other such relevant information. Combinations of operational modes, configuration settings, software updates, and other downloadable data are possible, as would be apparent to a person having ordinary skill in the art.

In a preferred embodiment, the power management or power saving mode further comprises display brightness management, wireless connectivity, processor speed and function, and a system update facility. As an example, in a situation where battery power is low, the self-contained module can be configured to shut down high power consuming applications, or to shut down low-priority (and high-power consuming) applications so that high-priority applications keep running for a longer period of time.

Figure 5:
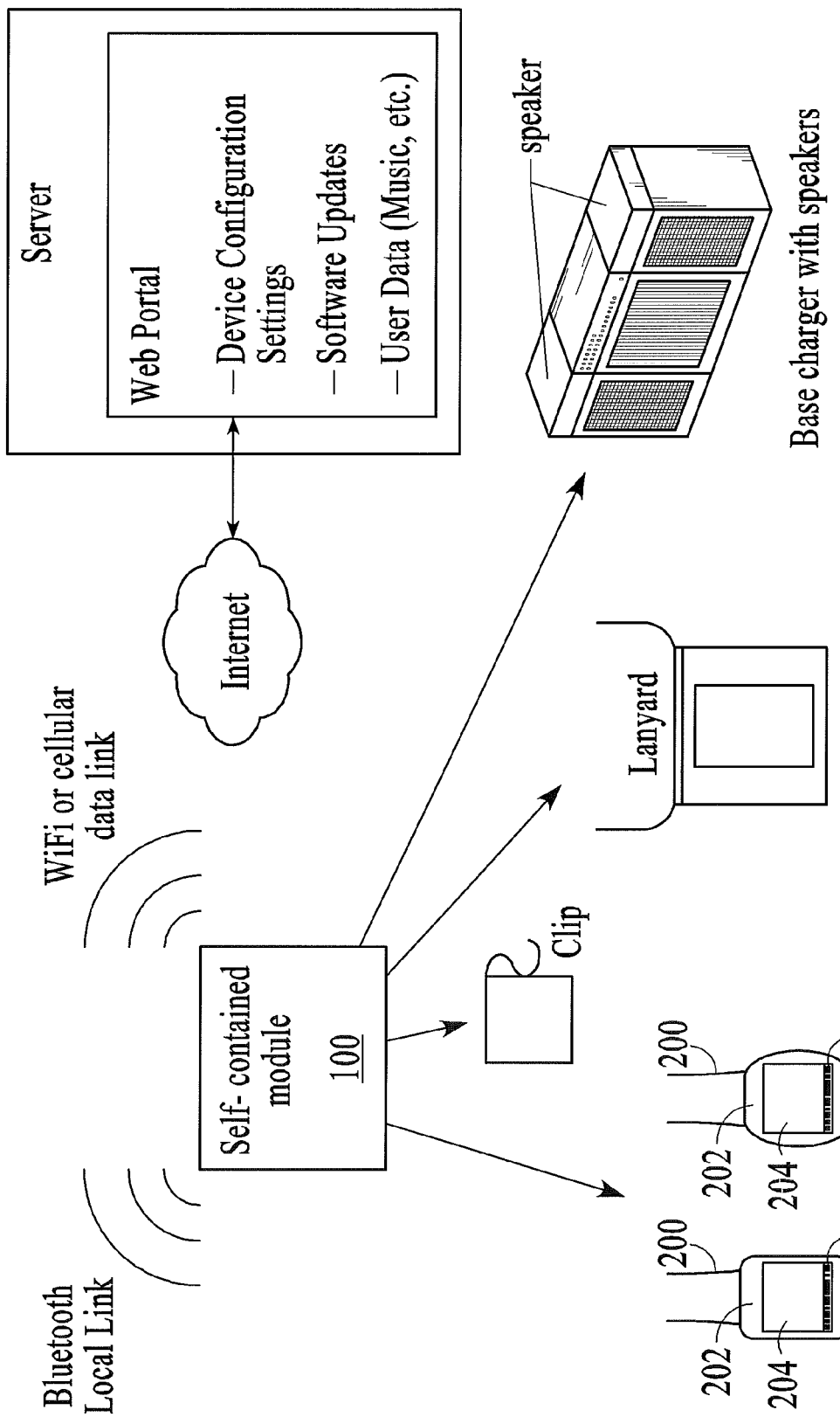
FIG. 5 illustrates the whole system, its various components, and alternative accessory options of an embodiment.

As illustrated in FIGS. 2a-2e, there are several possible variants of compatible accessory types with which the self-contained module can configure (and reconfigure) itself. FIG. 5 illustrates the entire system, its various components, and alternative accessory options of an embodiment. The accessories may comprise electrical contacts, a mechanical coding scheme, RFID circuits, or magnets placed in a coded fashion, which said electrical contacts, mechanical coding scheme, RFID circuits, and magnets can communicate a multitude of encoded data to the self-contained module when the said module is attached or connected to the accessory.

FIG. 2a illustrates a preferred embodiment for a watch band that employs a magnetic coding scheme. When a self-contained module is plugged into the watch band, a magnetic code reader on the self-contained module detects the type of watch-band (formal watch band, sports watch band, shape of the watch-band casing, etc.), the brand, and other relevant information that may be embedded in the magnetic coding scheme. The magnets also serve an additional function of providing mechanical connection, by magnetic attraction, and keep the module held in place in the accessory case. In a preferred embodiment, encoded data includes information such as name of the accessory brand, lifestyle theme, watch band/case style, watch face shape, watch size, and accessory type. This encoded information, when read by the self-contained module, enables the self-contained module to reconfigure (or configure) itself according to an appropriate occasion, lifestyle theme, function, watch face or other accessory face shape, watch or other accessory size, etc. Additionally, the encoded data further enables the self-contained module to run specific applications based on the accessory to which it is attached.

An embodiment includes, in a self-configuring electronic data and communication device comprising a self-contained module and an accessory to which the self-contained module is connected, a system for facilitating communication between the self-contained module and the accessory. The system comprises electrical contacts embedded in the self-contained module, which contacts connect with electrical contacts embedded in the accessory. The electrical interface can be unique, or conforming to existing standards, such as USB. Alternatively, the system may comprise a grooved set of slots on the module, which slots fit into complementary coded ridges on the accessory. In yet another embodiment, the system comprises a detection device on the module, which detection device identifies a set of magnets placed in a coded fashion on the accessory. In preferred embodiments that employ the grooved set of slots and coded ridges, the ridges are coded according to an accessory type, an accessory brand, lifestyle theme, accessory style, shape, and size, all of which coding is read by the grooved slots of the module, so that the self-contained module configures itself accordingly. Again, in embodiments that use magnets, a preferred embodiment comprises magnets placed in a coded fashion and containing a multitude of data detected and read by the electronic device, which data comprises information on accessory brand, lifestyle theme, watch band/case style, watch face shape, watch size, and also information on accessory type which could include watch bands, clips, lanyards, docking stations, sound systems, base chargers, etc. so that the self-contained module can use the detected information to configure itself accordingly. In embodiments that use RFID circuits, preferred embodiments comprise passive or active RFID tags containing a multitude of data detected and read by the module, wherein the data comprises information on accessory brand, lifestyle theme, watch band/case style, watch face shape, watch size, and information on accessory type which could include besides watch bands, clips, lanyards, docking stations, sound systems, base chargers, etc. Additionally, the RFID capability on the self-contained module enables the module for other near field communications, wherein the module could also function to perform financial transactions like purchases at a grocery store, a shopping mall, etc.

Even as the industry strives to develop advancements and provide increased computing power and functionality while decreasing size and power consumption, attempts to incorporate these advancements in wrist watches have met with limited success. Although special wearable wrist watches are available which besides time-keeping, provide the user with a compass, a GPS monitor, a barometer, altimeter, heart rate monitor, etc. they require continuous user configuration (and hence fiddling) through mechanical input buttons, and are not effective data and communication devices. Embodiments disclosed require minimum user input for configuration. Further, preferred embodiments enable remote manual configuration if needed. This enables very easy operability, as onboard programming is minimal or eliminated completely, and saves the device from wear and tear due to constant fiddling. Preferred embodiments sense user activity, the wearable accessory to which it is attached, and run an application or applications based on a sensed activity, the accessory to which it is attached, and a pre-configured lifestyle pattern, theme or occasion, without any user intervention.

Disclosed embodiments are wireless self-configuring devices. Preferably, they are wearable, and equipped for multiple uses and for sensing and self-reconfiguring based on sensed user activity, lifestyle-specific pre-programming, occasion, or user specific requirement. Yet additionally, embodiments wherein the accessories make the wireless self-configuring devices wearable contribute in the devices' configurability.

The embodiments described disclose a self-contained module that is an electronic data and communication device, that can configure itself to specific identified functions in a multitude of scenarios, including configuration by detecting, identifying, and communicating with a wearable accessory to which it is attached or connected, and further configure itself according to user activity, a user lifestyle or lifestyle theme, or other user-specific needs or requirements. Preferred embodiments disclose a self-contained module that is an electronic data and communication device, which is also compact, multi-functioning, and that can give a user access to a myriad of applications and data without the tedium of having to constantly and manually program functionality via non-intuitive mechanical buttons, as is common with state-of-the-art watches.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of the above teachings, and it is thus intended that the scope of invention not be limited by this Detailed Description, but by the claims following

The invention claimed is:

1. A self-configuring electronic data and communication device comprising a wearable self-contained module, a processing unit coupled to a memory element, and having instructions encoded thereon, which instructions cause the device to:
   gather and use information from a plurality of sources;
   determine, based on the information gathered, a user's activity and context;
   self-configure based on the user's activity and context an operational mode in a plurality of operational modes, wherein the self contained module further comprises intelligent situational awareness derived from pre-programmed criteria which includes configuring at least one of a calendar-awareness, a sensing ability, a user-specified lifestyle theme, a communication functionality which includes locational awareness, and a user motion pattern; and further self-configure according to a type of accessory to which it is connected; and wherein according to the accessory type, some operational modes are enabled while other operational modes are disabled.

2. The self-configuring electronic data and communication device of claim 1 wherein the instructions encoded further cause the self-contained module to detect the accessory and enter into an operational mode according to detected accessory when the self-contained module is connected to the said accessory.

3. The self-configuring electronic data and communication device of claim 1 wherein the self-contained module further comprises at least one of a sensor and a plurality of sensors.

4. The self-configuring electronic data and communication device of claim 3 wherein the sensor and plurality of sensors comprise a motion detection sensor, a temperature sensor, a touch sensor, a bio-sensor, a pressure sensor, a GPS system and a light sensor.

5. The self-configuring electronic data and communication device of claim 4, wherein the instructions encoded cause the self contained module to use motion detection sensor information to interpret user motion and configure itself into a preferred operational mode based on intelligent interpretation of patterns of the user's motions.

6. The self-configuring electronic data and communication device of claim 4 wherein the instructions encoded cause the self-contained module to use temperature sensor information to record and display an ambient temperature, a wearer's body temperature, and for interpreting and informing the user in case of an health anomaly based on said recorded wearer's body temperature.

7. The self-configuring electronic data and communication device of claim 4 wherein the instructions encoded cause the self-contained module to use the bio-sensor to record and display a wearer's health parameters, and to use the GPS system to find and alert a nearest hospital in case of a user emergency condition based on said recorded health parameters, and for providing health related information wirelessly to a host computer or service.

8. The self-configuring electronic data and communication device of claim 4 wherein the instructions encoded cause the self-contained module to use the light sensor to record an ambient luminance, and for configuring a display brightness and controlling power consumption by the module based on said recorded ambient luminance.

9. The self-configuring electronic data and communication device of claim 1 wherein
   the operational mode in the plurality of operational modes entered into, based on the said intelligent situational awareness derived from at least one of the said pre-programmed criteria, sensing ability, user-specified lifestyle theme, a communication functionality, accessory, and user motion pattern comprises at least one of:
   a sports mode of operation wherein applications that are relevant when a user is performing an athletic activity are activated, and other applications are shut down to conserve power and computing resources;
   a professional life workday mode of operation wherein applications that are relevant when a user is at work are activated, and other applications are shut down to conserve power and computing resources;
   a weekend mode of operation wherein applications that are relevant to and used by a user over weekends are activated, and other applications are shut down to conserve power and computing resources;
   a shopping mode of operation wherein applications that are relevant to and used by a user while shopping are activated, and other applications are shut down to conserve power and computing resources; and
   a holiday mode of operation wherein applications that are relevant when a user is on vacation are activated, and other applications are shut down to conserve power and computing resources.

10. The self-configuring electronic data and communication device of claim 1, wherein the accessory comprises at least one of a watch band, a watch case, a lanyard, a clip, a handheld case, and a charging base.

11. The self-configuring electronic data and communication device of claim 10 wherein the watch band, watch case, the lanyard, the clip, the handheld case, and the charging base are branded, and bundled together with accessory and brand specific applications, update facilities, and services.

12. The self-configuring electronic data and communication device of claim 11 wherein the self-contained module configures its' display size, shape, and operational mode based on the brand, type, and shape of the accessory to which it is connected.

13. The self-configuring electronic data and communication device of claim 11 wherein the self-contained module adapts its display shape, size, and operational mode based on the shape and size of the watch band or case to which it is attached.

14. The self-configuring electronic data and communication device of claim 1 wherein the self-contained module further comprises at least one of a GPS receiver and a wireless link.

15. The self-configuring electronic data and communication device of claim 14, wherein the instructions encoded cause the self-contained module to use the GPS receiver and wireless link for self configuration, which self configuration includes at least one of running a preferred application and searching for and displaying relevant data based on a detected current location.

16. The self-configuring electronic data and communication device of claim 1 wherein the communication functionality includes location awareness derived from at least one of GPS and cell tower triangulation.

17. The self-configuring electronic data and communication device of claim 16, wherein the instructions encoded cause the self-configuring based on the GPS functionality to determine user location, and accordingly at least one of run an application and display location relevant data.

18. The self-configuring electronic data and communication device of claim 1 wherein the instructions encoded cause the self-configuring based on said pre-programmed criteria wherein the self-configuring is derived from a calendar-awareness, and based on at least one of a time of the day, a day of the week, a holiday, a festival, a schedule, a scheduled event, and a user input schedule.

19. The self-configuring electronic data and communication device of claim 1, wherein the instructions encoded cause the self-configuring based on the lifestyle theme including detecting a lifestyle theme according to the accessory type to which the self-contained module is connected.

20. The self-configuring electronic data and communication device of claim 1 wherein the instructions encoded cause the self-contained module to enter an operational mode from a plurality of operational modes comprising at least one of running an application and displaying it on a user home page, running a preferential application, ordering a set of applications, displaying an orientation based on accessory type to which the self-contained module is attached, a graphic motif in a lifestyle theme and accessory style, a style in a lifestyle theme and specific accessory style, and power management and power saving.

21. The self-configuring electronic data and communication device of claim 20 wherein in a power management and power saving application, the self contained module further comprises display brightness management, wireless connectivity, processor speed and function, and a system update facility.

22. The self-configuring electronic data and communication device of claim 1 wherein the accessory comprises at least one of electrical contacts, a mechanical coding scheme, magnets placed in a coded fashion, and RFID tags, which said electrical contacts, mechanical coding scheme, magnets, and RFID tags communicate a multitude of encoded data to the self-contained module when the said module is connected to the accessory.

23. The self-configuring electronic data and communication device of claim 22 wherein the self-contained module further comprises at least one of complimentary electrical contacts, a mechanical coding scheme, magnets placed in a coded fashion, and RFID tags for recognizing the accessory brand, lifestyle theme, watch band/case style, watch face shape, watch size, and accessory type based on the encoded data.

24. The self-configuring electronic data and communication device of claim 23 wherein the complimentary electrical contacts, the mechanical coding scheme, magnets placed in a coded fashion, and RFID tags for recognizing the accessory brand, lifestyle theme, watch band/case style, watch face shape, watch size, and accessory type based on the encoded data cause theself-contained module to run specific applications according to the accessory to which it is connected, based on the encoded data detected on the said accessory.

25. A system, comprising:
an accessory; and
in a self-configuring electronic data and communication device comprising a self-contained module connected to the accessory, the self-contained module including:
a display and a processing unit coupled to a memory element having instructions encoded thereon that cause the self-contained module to determine a user's activity and context based on information gathered from a plurality of sources, and to self-configure, based on the user's activity and context, an operational mode in a plurality of operational modes; and
a system for configuring the self-contained module according to a type the accessory to which the self-contained module is connected, the system comprising at least one of:
 a. electrical contacts embedded in the self-contained module which connect with complementary electrical contacts embedded in the accessory;
 b. a grooved set of slots on the self-contained module, which slots fit into complementary coded ridges on the accessory;
 c. a detection device on the self-contained module, which detection device identifies a set of magnets placed in a coded fashion on the accessory; and
 d. a RFID capability on the self-contained module, which RFID capability identifies a RFID tag on the accessory;
and wherein according to the accessory type, at least one operational mode is enabled, while other operational modes are disabled.

26. The system of claim 25 wherein the grooved slots on the self-contained module fit into the coded ridges of the accessory, which ridges are coded according to at least one of accessory type, brand, lifestyle theme, accessory style, shape, size, and such coding is read by the grooved slots of the self-contained module.

27. The system of claim 25 wherein the magnets are placed in a coded fashion and include a multitude of data detected and read by the self-contained module, said data comprising information on at least one of brand, lifestyle theme, watch band/case style, watch face shape, watch size, and accessory type.

28. The system of claim 25, wherein the RFID tag is a passive RFID tag.

29. The system of claim 25, wherein the RFID tag is an active RFID tag.

30. A self-configuring wearable electronic data and communication device comprising:
   a. a self-contained module comprising a display, a plurality of sensors, and a processing unit coupled to a memory element having instructions encoded thereon, which instructions cause the self-contained module to:
      self-configure based on a user's activity and context an operational mode in a plurality of operational modes, wherein the self contained module further comprises intelligent situational awareness derived from at least one of pre-programmed criteria, a sensing ability, a user-specified lifestyle theme, a communication functionality, an accessory, and a user motion pattern; and
   b. wherein the self-contained module is further configured to detect the accessory when the self-contained module is connected to the said accessory, and according to the accessory type, some operational modes are enabled, while other operational modes are disabled.

31. The self configuring electronic data and communication device of claim 30, wherein the self-contained module further comprises at least one of a cell-phone, a PDA, a laptop, a watch, and an MP3 player computing functionality.

32. The self-configuring electronic data and communication device of claim 30 wherein the instructions encoded cause the self-contained module to reconfigure itself, based on sensor information from a pressure sensor, to record and display an altitude and a rate of change of altitude, based on which the self-contained module reconfigures itself to run an appropriate application or applications.

33. The self-configuring wearable electronic data and communication device of claim 30 further comprising electrical contacts embedded in the self-contained module which connect with complementary electrical contacts embedded in the accessory.

34. The self-configuring wearable electronic data and communication device of claim 30 further comprising a grooved set of slots on the self-contained module, which slots fit into complementary coded ridges on the accessory.

35. The self-configuring wearable electronic data and communication device of claim 34 wherein the grooved slots on the self-contained module fit into the coded ridges of the accessory, which ridges are coded according to at least one of accessory type, brand, lifestyle theme, accessory style, shape, size, and such coding is read by the grooved slots of the self-contained module.

36. The self-configuring wearable electronic data and communication device of claim 30 further comprising a detection device on the self-contained module, which detection device identifies a set of magnets placed in a coded fashion on the accessory.

37. The self-configuring wearable electronic data and communication device of claim 36 wherein the magnets are placed in a coded fashion and include a multitude of data detected and read by the self-contained module, said data comprising information on at least one of brand, lifestyle theme, watch band/case style, watch face shape, watch size, and accessory type.

38. The self-configuring wearable electronic data and communication device of claim 30 further comprising a RFID capability on the self-contained module, which RFID capability identifies a RFID tag on the accessory.

39. The self-configuring wearable electronic data and communication device of claim 38, wherein the RFID tag is a passive RFID tag.

40. The self-configuring wearable electronic data and communication device of claim 38, wherein the RFID tag is an active RFID tag.

41. The self-configuring wearable electronic data and communication device of claim 30 further comprising contacts embedded in the self-contained module, which contacts connect with complementary contacts embedded in the accessory.

42. The self-configuring wearable electronic data and communication device of claim 41, wherein the contacts are non-electrical contacts coded in a binary fashion which contacts connect and communicate with complementary binary coded contacts embedded in the accessory.

43. The self-configuring wearable electronic data and communication device of claim 42, wherein the contacts are USB compatible electrical contacts, used for coding an electronic accessory.

* * * * *